United States Patent
Halley et al.

(10) Patent No.: US 7,094,817 B2
(45) Date of Patent: Aug. 22, 2006

(54) BIODEGRADABLE POLYMER

(75) Inventors: Peter Halley, Brisbane (AU); Stewart Mcglashan, Brisbane (AU); John Gralton, Brisbane (AU)

(73) Assignee: Plantic Technologies Ltd., Victoria (AU)

( * ) Notice: Subject to any disclaimer, the term of this patent is extended or adjusted under 35 U.S.C. 154(b) by 355 days.

(21) Appl. No.: 10/474,907

(22) PCT Filed: Apr. 17, 2002

(86) PCT No.: PCT/AU02/00498

§ 371 (c)(1),
(2), (4) Date: Oct. 16, 2003

(87) PCT Pub. No.: WO02/083784

PCT Pub. Date: Oct. 24, 2002

(65) Prior Publication Data

US 2004/0122135 A1    Jun. 24, 2004

(30) Foreign Application Priority Data

Apr. 18, 2001  (AU) .................................... PR4437
Nov. 30, 2001  (AU) .................................... PR9211

(51) Int. Cl.
  C08L 3/02   (2006.01)
  C08L 3/12   (2006.01)

(52) U.S. Cl. .................. 524/47; 524/386; 524/387; 524/445; 524/447; 524/449

(58) Field of Classification Search .................. 524/47, 524/386–387, 445, 447, 449
See application file for complete search history.

(56) References Cited

U.S. PATENT DOCUMENTS

| | | |
|---|---|---|
| 5,206,087 A | 4/1993 | Tokiwa et al. |
| 5,750,218 A | 5/1998 | Nishida et al. |
| 6,096,809 A | 8/2000 | Lorcks et al. |
| 6,231,970 B1 | 5/2001 | Andersen et al. |

OTHER PUBLICATIONS

International Search Report.

*Primary Examiner*—Peter Szekely
(74) *Attorney, Agent, or Firm*—Connolly Bove Lodge & Hutz LLP

(57) ABSTRACT

A biodegradable polymer includes a) 20 to 60% of a mixture of starch and/or a modified starch, b) 8 to 22% of starch plasticisers and processing agents c) 30 to 70% of one or more biodegradable aliphatic polyesters d) 1 to 10% of a layered silicate clay mineral. The silicate mineral is an organoclay which has been formed by reacting clay with an intercalating chemical to compatibilise it with the polymers so that the clay is exfoliated and makes the blend amorphous. The polymers may also include the usual additives including e) from 0 to 20% by weight of a polyol plasticiser f) from 0.1 to 1.5% by weight of a $C_{12-22}$ fatty acid or salt or a destructing agent preferably urea and/or urea derivatives, and g) from 0 to 12% by weight of added water. The polyester may be modified by reaction with maleic anhydride.

6 Claims, No Drawings

BIODEGRADABLE POLYMER

This invention relates to improvements in biodegradable polymeric products particularly starch based polymers.

BACKGROUND TO THE INVENTION

There is an increasing demand for many plastic products used in packaging to be biodegradable.

Starch films have been proposed as biodegradable alternatives for some time. U.S. Pat. No. 3,949,145 proposed a starch/polyvinyl alcohol/glycerol composition for use as a biodegradable agricultural mulch sheet.

Difficulties have been encountered in producing starch based polymers particularly by hot melt extrusion. The molecular structure of the starch is adversely affected by the shear stresses and temperature conditions needed to plasticise the starch and pass it through the extrusion die. For most products foaming has to be avoided and this generally requires attention because of the water content of the starch. Foaming has been avoided by degassing the melt prior to exiting the die as suggested in U.S. Pat. Nos. 5,314,754 and 5,316,578. The latter patent also avoids adding water to the starch. As explained in U.S. Pat. No. 5,569,692 by not drying starch and avoiding the addition of water the starch can be processed at temperatures between 120° C. and 170° C. because the water bound to the starch does not generate a vapour pressure such as to require high pressures.

Another approach to improving the melt processability of starch is to provide an additive as in U.S. Pat. No. 5,362,777 which reduces the melting point of the starch. The additive is selected from dimethyl sulfoxide, a selection of polyols and amino or amide compounds.

In order to produce starch polymers for particular applications they have been blended with a range of other polymers. Biodegradable blown films are disclosed in U.S. Pat. No. 5,322,866 which blends raw starch, polyvinyl alcohol and talc with glycerol and water.

Flexible and clear transparent sheets are disclosed in U.S. Pat. No. 5,374,304. These are composed of a high amylose starch and a glycerol plasticiser. The use of starch in conjunction with high amylose or modified starches has also been proposed. U.S. Pat. Nos. 5,314,754, and 5,316,578 both suggest the use of modified starches including hydroxypropyl substituted starches.

Hydroxypropylation reportedly increases elongation at break and burst strength and improved resilience in the polymers. Although the efficacy of these special and modified starches is recognised, their cost inhibits the commercial acceptability of the products made from them.

Another approach has been to blend starch with biodegradable polyesters. U.S. Pat. Nos. 5,346,936 and 6,096,809 are examples of the use of starches and polyesters to improve the wet strength of the films. The high content of the polyester increases the overall cost of films made from such blends to the point where they are not commercially viable.

In recent years nano clays have been proposed as polymer additives and U.S. Pat. No. 5,747,560 discloses the use a clay treated with an ammonium or phosphonium complex with nylon. U.S. Pat. Nos. 6,034,163 and 6,162,857 disclose the use of organoclays with polyesters. These polymers are not claimed to be biodegradable.

It is an object of this invention to provide a biodegradable polymer which can be processed without difficulty and have acceptable properties for its intended uses and also have a commercially acceptable cost.

BRIEF DESCRIPTIONS OF THE INVENTION

To this end the present invention provides a biodegradable polymer which includes
a) 20 to 60% of a mixture of starch and/or a modified starch,
b) 8 to 22% of starch plasticisers and processing agents
c) 30 to 70% of one or more biodegradable aliphatic polyesters
d) 1 to 10% of a layered silicate clay mineral.

The addition of the clay mineral improves the melt processability of the polymer and also improves the tensile strength and translucency so that higher starch contents are viable and acceptable biodegradable polymers can be produced at an acceptable cost.

The biodegradable polymers of this invention are useful for thermoforming and injection moulding items that are desirably biodegradable such as packaging trays and bags or containers. The polymers are also able to be formed into films and sheets including blow moulded films.

The polymers may also include the usual additives including
a) from 0 to 20% by weight of a polyol plasticiser
b) from 0.1 to 1.5% by weight of a $C_{12-22}$ fatty acid or salt or a destructuring agent preferably urea and/or urea derivatives, and
c) from 0 to 12% by weight of added water.

The upper limit to the content of the modified starch is determined by its cost. This component contributes structural benefits to the resulting material. A preferred component is hydroxypropylated amylose. Other substituents can be hydroxyethyl or hydroxybutyl to form hydroxyether substitutions, or anhydrides such as maleic phthalic or octenyl succinic anhydride can be used to produce ester derivatives. The degree of substitution [the average number of hydroxyl groups in a unit that are substituted] is preferably 0.05 to 2. The preferred starch is a high amylose maize starch. A preferred component is a hydroxypropylated high amylose starch A939 marketed by Penford Australia.

The other starch component is any commercially available starch. This may be derived from wheat, maize, potato, rice, oat, arrowroot, and pea sources. Generally the water content is about 10 to 15%. A preferred concentration range for starch is 20 to 50%.

The polymer component c) of the composition is preferably compatible with starch, water soluble, biodegradable with a low melting point compatible with the processing temperatures for starch. Biodegradable aliphatic polyesters are preferred. Also preferred are modified polyesters blended with the polyester. The inclusion of modified polyesters improve the compatibility with the starch components and assist in compatibilising the starch and the clay. Polyesters are preferably modified by reaction with unsaturated dibasic acids or anhydrides, maleic anhydride being preferred. Generally a portion of the polyester is reacted with up to 10% by weight of the dibasic acid and then blended with the polyester. The amount of maleic anhydride modified polyester is up to 2% by weight with 0.1 to 1% by weight of the total polyester being sufficient to provide improved compatibility and allowing compositions that have lower polyester to starch ratios typically of 30:50. It is generally found that the processability of the polymer blends of this invention are improved compared to using 100% polyester. By blending starch with the polyester the total cost of the polymer blend is reduced compared to 100% polyester.

The preferred plasticiser is glycerol although ethylene glycol and diethylene glycol are also suitable as is sorbitol. Cost and food contact are important issues in choosing the appropriate plasticizer. For low humidity environments such as biscuit packages it has been found that lower plasticizer content improves the toughness and long term resilience of the material. This is partly due to the properties of the starch ether component and the fact that at low humidity plasticizers such as glycerol tend to remove water from the starch polymer and make it more brittle. It is possible to process the formulation with no plasticizer and the rigid polymer formed is flexible and has good impact resistance at low humidity. When the plasticiser content is low additional water is added to improve processing. Thus the plasticiser and water are interchangeable and the plasticizer content is preferably 0 to 12% and the water content is 12 to 0%. For film processing the plasticizer content is preferably higher than for rigid sheet products. Higher concentrations of plasticiser improve flexibility and for flexible packaging films or mulch films the preferred plasticiser content is 10 to 16%. The fatty acid or fatty acid salt component is preferably present in concentrations of 0.6 to 1%. Stearic acid is the preferred component. Sodium and potassium salts of stearic acid can also be used. Again cost can be a factor in the choice of this component but lauric, myristic, palmitic, linoleic and behenic acids are all suitable. It is found that the acid tends to accumulate near to the surface of the composition as it is extruded.

The urea or urea derivatives are added to assist in destructuring the starch and like the stearic acid additive improve the polymer processability.

The layered silicate clay may be any compatible clay with a large surface area, a large aspect ratio and an appropriate platelet thickness. A preferred clay is montmorillonite [MMT]. The layered silicate clay is usually treated to make it compatible with the polymers. Ammonium or phosphonium salts are used to make the clay platelets compatible. As the starch content of the polymer blend increases the clay and the treatment made to the clay needs to be varied to ensure that the intercalating chemicals added to the clay are more compatible to starch than polyester. The clay modifiers may include chemicals with a hydrophillic and cationic part which is clay compatible and another part that is hydrophillic and H-bond active such as a carboxylic group that is starch compatible. The clay is used in sufficient quantity to produce an exfoliated or nanocomposite structure where the clay layers are completely interspaced with polymer. This structure retards crystal formation so that blended material is amorphous which results in transparency and improved elongation to break and acceptable tensile strength properties.

DETAILED DESCRIPTION OF THE INVENTION

The nanocomposites of interest are composed of polymers and layered silicate clay minerals. In this case the clay, montmorillonite (MMT), is used due to its high surface area (about 750 $m^2/g$), large aspect ratio (greater than 50), and platelet thickness of 10 Å. The inorganic surface of the clay is modified by organic treatments to make the platelet more compatible with the polymer. It is well documented that both the organic treatment and the blending process can significantly influence the degree of dispersion.

MMT differs from more commonly used fillers such as talc and mica because this layered silicate can be dispersed into individual layers only 10 Å thick. When MMT is blended into a polymer and the layers do not separate they are referred to as tactoids. Intercalation occurs when a small amount of polymer moves into the gallery spacing between the clay platelets, causing separations less than 20 Å to 30 Å. Exfoliation occurs with basal spacings of 80 Å to 100 Å or more. Ideally a well-dispersed nanocomposite consists of exfoliated platelets distributed homogeneously throughout the polymer. It is generally believed that maximum benefits are achieved when the platelets are uniformly dispersed, due to the potential of the fully exfoliated surface area.

EXAMPLE 1

Materials

A commercially available organoclay was dispersed into blends of starch and commercially available aliphatic polyester. The amount of starch was varied from 30 wt % to 70 wt %. Commercial film blowing grade biodegradable aliphatic polyester was obtained from Showa Highpolymer Co. Ltd, Tokyo, Japan. Two starches with different levels of amylopectin to amylose ratio (branched to linear) were used. Common wheat starch and a high amylose, chemically modified wheat starch from Goodman Fielder (Australia) were blended together with plasticisers and the polyester. Throughout this description any numerical quantity pertaining to percent content of starch includes the amount of plasticiser used to gelatinise the starch.

Blend Preparation

The blends were prepared using a 16 mm modular self-wiping, co-rotating, laboratory twin screw extruder (Eurolab16, Prism, Lichfield, Staffordshire, England). The barrel length to diameter ratio was 40:1 and is divided into eight zones. The processing conditions were kept as constant as possible throughout the compounding stage and documented via a data logging unit and computer. A medium shear screw design was used for all compounding.

Blends of varying starch content and weight percent and type of organoclay were compounded and examined on physical properties and processing and product performance. The organoclay was added to the starch and polyester in a dry state at levels of 1.5 wt % and 5 wt %, to the 30 wt %, 50 wt % and 70 wt % starch blends. Previous work in our laboratory demonstrated that swelling the organoclay in the starch plasticisers had little effect on the level of delamination of the platelets. A rudimentary optimisation process involving the screw speed, feed rate and heating zone temperatures was done to obtain the best processing conditions for 100 wt % starch thermoplastic. The issue of process optimisation for the nanocomposites compounding was not investigated and is not the focus of this work. However, processing conditions and screw configuration have been proven to have a significant influence on the delamination process.

Film Blowing

The extruded samples were pelletised (some extruded filaments were kept aside to conduct tensile experiments) and then film blown using an Axon BX-25 extruder (25 mm patented Gateway screw, 25:1 ratio) and tower (40 mm slot diameter film blowing head, 300 mm layflat). For all blends the temperature profile in the screw section was set at 100° C. and the operating temperature for the die and die lip were varied in order to produce optimal processing conditions (i.e. bubble stability and visual film quality). The effective draw down ratio ($DDR_{eff}$), blow up ratio (BUR) and layflat were kept constant in order to standardise the influences of the film blowing process. Film samples were obtained for wide-angle, X-ray scattering (WAXS) and tensile testing. This was done on an Instron 5500 tensile tester at a cross-head speed of 5 mm/min according to ASTM D638-97. Samples were conditioned at room temperature in a sealed container of constant humidity for 48 hours before testing.

Differential Scanning Calorimetry

A TA Instruments modulated DSC (TA2920) was used to determine the thermal transitions of the starch/polyester/organoclay blends. The sample size was 10-15 mg with heating and cooling rates of 10° C./min and 2°° C./min respectively.

Wide-Angle X-Ray Scattering

Wide-angle X-ray scattering (WAXS) patterns of the various samples were taken at room temperature on a Philips PW1050/25 X-ray diffractometer with CuK alpha radiation, in order to determine the degree of platelet separation. The rotating anode generator was operated at 40 kV and 40 mA. The analysis was run from 2θ=1 –10° at a rate of 0.5°/min and a step of 0.04°.

Physical Properties

As the starch content increases the tensile strength of base blend (i.e. no organoclay) decreases. When small amounts of organoclay are added in the compounding process a significant increase in tensile strength is observed for a given composition of starch polymer. Note tensile strength, strain to break, and Young's modulus all increase (Table 1). Also note that the values given for composition in Table 1 add to more than 100. The formulations were made in such a way that a batch would consist of, for example, 30 parts starch, 70 parts polyester and 1.5 parts organoclay. This way the ratio of polyester to starch would remain the same irrespective of the amount of clay added. Thus the actual percent content of starch or polyester varied slightly.

The strain at break was dramatically improved upon the addition of the clay to the 30 wt % starch blend (see Table 1). Both 30 wt % starch nanocomposite blends stretched to a point where the frame of the Instron was fully extended (which occurs at 1500%) and the experiment had to be halted. The tensile strength and Young's modulus of the nanocomposites improved by approximately 50% and 200% respectively over the base blend. This significant increase in tensile properties is most likely a result of having an exfoliated nanocomposite (see Table 2). An additional benefit of having MMT dispersed throughout the blend is that the volatile plasticiser has a more tortuous path to migrate to the surface and evaporate. This may be a source of the improved elongation of the nanocomposite (i.e. less brittle fracture).

TABLE 1

Tensile properties for extrudate filaments of starch/polyester/organoclay blends.

| Sample starch/polyester/clay | Tensile Strength (MPa) | Young's Modulus (MPa) | Strain at break (%) |
| --- | --- | --- | --- |
| 30/70/0 | 13 | 17 | 1086 |
| 30/70/1.5 | 18 | 58 | 1500+ |
| 30/70/5 | 17 | 64 | 1500+ |
| 50/50/0 | 9.5 | 22 | 184.6 |
| 50/50/1.5 | 11.5 | 52 | 615 |
| 50/50/5 | 13 | 38 | 1500+ |
| 70/30/0 | 5 | 15 | 260 |
| 70/30/1.5 | 4.6 | 14.4 | 310 |
| 70/30/5 | 7 | 24 | 860 |

Improvements were also noted for the 50 wt % and 70 wt % starch nanocomposite blends (see Table 1). All four nanocomposite blends, with the exception of the 70/30/1.5 sample, showed improvements in all tensile properties over the base blend. As the content of starch was increased, the increment improvement seemed to be smaller. The same was noted for the higher loading (5 wt %) of MMT. The extent of intercalation and exfoliation seem to be a contributing factor for both sets of results. The higher the starch loading the less the clay seems to delaminate (see Table 2), hence the MMT is less effective. Adding more MMT does not seem to be the answer. Although, relatively speaking, there is a larger amount of exfoliated and intercalated platelets in the blend, the addition of more MMT seems to produce more tactoids and partially intercalated platelets. Thus the improvement in tensile properties is marginal. The effectiveness of the MMT at higher starch loadings can be improved by selecting more appropriate intercalating chemicals that are more compatible with starch than polyester.

X-Ray Analysis

WAXS provided information about the exfoliation process. It is generally thought that the polymer enters the organoclay galleries and forces the platelets apart (intercalation). As more polymer enters the gallery the platelets become disordered, causing broader peaks and a wider distribution of these peaks.

The film produced from the nanocomposite blends was examined with WAXS. The organoclay seemed to delaminate more effectively with higher concentrations of polyester (Table 2). The organic constituents of organoclay consist of alcohols and hydrogenated tallow, which may be more thermodynamically compatible with the polyester and explain such a trend.

TABLE 2

WAXS results for all nanocomposites.

| Sample Starch/polyester/clay | Silicate layer (basal) spacing (Å) | Nanocomposite |
| --- | --- | --- |
| Organoclay | 18.7 | — |
| 30/70/1.5 | — | Exfoliated |
| 30/70/5 | 31.1 (B) | Intercalated |
| 50/50/1.5 | 38.7 (B) | Intercalated |
| 50/50/5 | 35.6 (N), 16.6 (B) | Partially intercalated |
| 70/30/1.5 | 32.5 (N), 16.7 (B) | Partially intercalated |
| 70/30/5 | 34.0 (N), 16.2 (B) | Partially intercalated |

Note B = broad peak and N = narrow peak.

The significant increase in tensile properties of the high polyester content, nanocomposite blends (Table 1) could be attributed to the exfoliation of the platelets and retention of plasticiser. As the content of starch increases in the polymer blend the level of delamination decreases. The benefits of compounding such a nanocomposite, as demonstrated in the tensile properties (Table 1), are smaller as a result. The partially intercalated starch nanocomposites show peaks at a basal spacing less than 18.7 Å, which means the tactoids were slightly compressed during the compounding process.

EXAMPLE 2

Blown Film Processing

The film blowing characteristics of the blends is difficult to report due to the nature of the experiment. Much of the information gathered (e.g. bubble stability, film quality) relies heavily on the observations and opinion of the operator. All materials were blown into film at constant processing conditions (i.e. mass flowrate, BUR, $DDR_{eff}$) in order to eliminate as much process induced variation in the results as possible. The die and die lip temperatures were adjusted to ensure an optimal extrudate viscosity in order to blow the best film possible and the extruder heating zones were kept at 100° C.

The polyester and starch components have very different viscosities and melting (gelatinisation for starch) temperatures. Thus a low starch content blend has a much lower viscosity and requires lower processing temperatures. So, as the loading of starch increased the die and die lip temperatures had to be increased. An unfortunate consequence of this action was flashing of part of the plasticiser at the die lip, which typically generated a hole in the bubble and caused it to collapse. 100 wt % starch could not be processed into film due to this problem.

The 30 wt % starch base blend was the easiest of the base blends to film blow. The resulting film had a starchy/papery feel but was relatively transparent. The addition of MMT had several notable effects on the processing properties of the blend. The work required to melt and transport the polymer to the die lip decreased with increasing clay content. The process seemed to be more stable with the addition of clay and the die and die lip temperatures could be lowered without detrimentally affecting the film blowing process. Film clarity also improved with increasing clay content.

Finally, the resulting film felt more like a traditional polymer film. These observations may result from the exfoliated MMT acting as a barrier for plasticiser migration and evaporation. The viscosity is lower with more plasticiser present, hence less work is required to melt and transport the blend. With higher plasticiser content the starch is more likely to stay in an amorphous phase, rather than recrystallise, allowing for better light transmission.

Similar results were observed in the 50 wt % and 70 wt % starch nanocomposite blends. The most dramatic improvement seemed to be in the 70 wt % starch nanocomposite blend. The film was homogenous and clearer than all of the previous films blown, with the exception of pure polyester film. The film blowing process was stable and die and die lip temperatures was maintained as high as 150° C. without foaming. The higher processing temperatures lowered the viscosity of the predominantly starch based nanocomposite to a level that alleviated a lot of the problems associated with processing the base blends (i.e. high melt viscosity and trying to stretch a nearly solid extrudate).

Processing at these high temperatures was possible due to the same barrier properties of the MMT infused nanocomposite.

Differential Scanning Calorimetry

Differential scanning calorimetry was used to evaluate the thermal transitions (e.g. melting and crystallisation) of these blends. To eliminate thermal history the sample was heated to 130° C. at 10° C./min, cooled at 20° C./min to −50° C. and then heated to 200° C. at 10° C./min.

For pure polyester the melting endotherm occurred at 91° C. with enthalpy of 87.7 J/g. The 100 wt % starch blend did not show an endotherm up to 130° C. which indicates that the starch crystalline phase has been partially or completely destroyed during the thermo-mechanical compounding.

Thermal transitions such as melting and crystallisation are also important factors to consider in polymer processing. The base blends show a slight trend in melting [endotherm] temperature (Table 3) which may be due to the interaction between the starch and plasticiser and the polyester. The difference in the exotherm peaks, for any given starch/polyester blend, is quite significant. The clay platelets and polymer interact in both intercalated and exfoliated nanocomposites. As the blend is cooled the platelets inhibit ordering in the polymer and crystal growth, thus retarding the solidification [exotherm] process. The greatest difference in exotherms is for the 30 wt % starch blends, which is expected since it is also the most exfoliated nanocomposite. Note that although the exotherm peak is lower still for the 30 wt % starch blend with 5 wt % clay, this is most likely due to the presence of more intercalated and exfoliated platelets and not tactoids.

TABLE 3

Thermal transitions for the nanocomposites and their base blends.

| Sample Starch/Polyester | Base blend | | 1.5 wt % Organoclay | | 5 wt % Organoclay | |
|---|---|---|---|---|---|---|
| | Endotherm T(° C.) | Exotherm T(° C.) | Endotherm T(° C.) | Exotherm T(° C.) | Endotherm T(° C.) | Exotherm T(° C.) |
| 0/100 | 91 | 47 | | | | |
| 30/70 | 88.4 | 51.5 | 87.4 | 45.4 | 87.1 | 42.0 |
| 50/50 | 86.5 | 47.1 | 85.9 | 42.7 | 85.4 | 42.0 |
| 70/30 | 86.2 | 46.7 | 85.6 | 45.1 | 85.3 | 41.7 |
| 100/0 | — | ≈105–110 | — | — | — | — |

Conclusions

There were significant visual and textural differences in the films of the base blends. As the concentration of starch increased film clarity decreased dramatically and the final product had more of a tissue paper feel rather than a normal plastic film. This may be due to loss of some of the volatile plasticiser during the film blowing process, which would cause incomplete melting of the starch. The resulting film would then consist of micelles of high modulus, partially crystalline starch surrounded by an amorphous phase of polyester. The presence of these micelles would significantly effect the mechanical properties of the blend, allowing stress to build up at the interface, and ultimately poorer tensile properties.

Biodegradable blends of starch and polyester gave significantly improved tensile properties when compounded with small amounts of organoclay to form nanocomposites. The type of nanocomposite produced (intercalated or exfoliated) depended on the amount of clay added and the ratio of starch to polyester.

The nanocomposite blends were easier to process than the base blends using a film blowing tower. The nanocomposites did not foam when temperatures as high as 150° C. were used at the die and die lip. The nanocomposite films produced were more transparent and homogenous which could be attributed to the dual effect of platelets trapping the volatile plasticiser in place and retarding crystal growth in the cooling phase of the process.

The crystallisation temperature of the nanocomposite blends is significantly lower than the base blend. This is probably due to the platelets inhibiting order, and hence crystallisation, of the starch and polyester.

EXAMPLE 3

Composition: 30 parts SPF, 70 parts Enpol (G4600) and 1.5 parts Cloisite 30B Note: To simplify the comparison between different blends parts is used instead of % when describing the composition of the polymer blend. Enpol is a biodegradable aliphatic polyester with food contact approval.

Sample Preparation

A rotating granulator with a heating element was used to produce granules of SPF. The dry components were added to the granulator and then the solution of water, glycerol and urea was added as a fine mist to ensure complete and homogenous mixing. Once all the components were added and mixed the water content of the system was reduced to 17% using the heating element on the granulator.

Extrusion

The Eurolab 16 mm Twin Screw Extruder (intermeshing co-rotating twin-screw extruder L/D ratio 40:1 and 16 mm D) was used to melt compound the 30 parts SPF/70 parts Enpol (G4600)/1.5 parts Cloisite30B polymer blend. Temperature profiles, feed rates and screw speeds used are reported in the result section of this document. The extruder produced material in the form of 2 mm strands which was then pelletised at a high speed to ensure small, even pellets in preparation for film blowing.

Film Blowing

The Axon BX-25 single screw extruder and film tower was then used to produce blown film. The Axon BX-25 consists of a 25 mm patented Gateway screw with a length to diameter ratio of 25:1 and the tower consists of a 40 mm slot diameter film die. The temperature profile and film blowing parameters used to manufacture the film are listed in the results section of this document.

The tensile properties of the film were measured with an Instron (model 5584) and using Merlin software (version 4.42). The tensile test were performed with a strain rate of 5 mm/min in accordance to ASTM D882-97 and provides information on the yield stress, tensile strength, tensile strain and Young's modulus of the film.

Results

Extrusion

Tables 4 and 5 describe the extrusion temperature and processing profiles used to melt compound the polymer blend. The extruded strands contained voids (possibly vapor cells) but not on the surface and was only evident when the strands cross section was examined.

TABLE 4

| Extruder zone temperatures (° C.). | | | | | | | | | | |
|---|---|---|---|---|---|---|---|---|---|---|
| Die | 9 | 8 | 7 | 6 | 5 | 4 | 3 | 2 | 1 | Feed |
| 95 | 110 | 120 | 130 | 130 | 130 | 130 | 130 | 120 | 100 | Cool |

TABLE 5

| Extrusion profile | | | |
|---|---|---|---|
| Feed (%) | Screw RPM | Torque (%) | Exit Pressure (bar) |
| 7 | 100 | ~80 | ~13 |

Film Blowing

The following tables summarises the processing and temperature profiles used during film blowing. The processing parameters produced a very stable film with a layflat of 280 mm, thickness of 10 –151 μm and take up speed of 6 m/s. Throughout the process the extruder speed was keep constant at 30 and the winder also remained constant at a setting of 4. The constant extruder speed produced a torque of 3 Amps, which is very similar to other samples with the same extruder speed.

TABLE 6

| Temperature profile used for film blowing (° C.). | | | | | |
|---|---|---|---|---|---|
| Die | Valve/Die | 4 | 3 | 2 | 1 |
| 110 | 105 | 100 | 115 | 110 | 85 |

Mechanical Properties

TABLE 7

| Summary of the tensile properties of the film taken in the machine direction. | | | | |
|---|---|---|---|---|
| Machine Direction | Tensile Strength (MPa) | Tensile Strain (%) | Yield Stress (MPa) | Young's Modulus (3%) (MPa) | Thickness (μm) |
| Mean (sd) | 25 (3.5) | 142 (27) | 28 (3.5) | 188 (18) | 14 (2) |
| Maximum | 31 | 173 | 33 | 207 | 17 |
| Minimum | 20 | 99 | 22 | 160 | 12 |

TABLE 8

Summary of the tensile properties of the film taken in the cross direction.

| Cross Direction | Tensile Strength (MPa) | Tensile Strain (%) | Yield Stress (MPa) | Young's Modulus (3%) (MPa) | Thickness (μm) |
|---|---|---|---|---|---|
| Mean (sd) | 12 (1) | 85 (20) | 15 (2) | 165 (74) | 13 (1.5) |
| Maximum | 14 | 126 | 18 | 261 | 15 |
| Minimum | 8 | 51 | 12 | 79 | 10 |

Conclusion

The film examined in this report shows some promise. The blown film was produced at the maximum stable take-up and layflat (optimized for approx. 300 mm) for the extrusion and temperature profiles mentioned above. This suggests that with further optimization of the extrusion process a thin stable film may be produced wider and faster.

EXAMPLE 4

The three compounded samples for film blowing were made to the following compositions (wt/wt) using the Starch Patent Formulation (SPF), Enpol® and Cloisite® 30B.

| Component | Blend 1 30SPF/ 70Enpol ® | Blend 2 30SPF/ 70Enpol ®/ 1.5Cl30B | Blend 3 70SPF/ 30Enpol ®/ 5Cl30B |
|---|---|---|---|
| A939* | 0.135 | 0.135 | 0.315 |
| Wheat Corn* | 0.072 | 0.072 | 0.168 |
| Glycerol* | 0.042 | 0.042 | 0.098 |
| Distilled H₂O* | 0.0507 | 0.0507 | 0.1183 |
| Urea* | 0.0003 | 0.0003 | 0.0007 |
| Enpol ® (G4400) | 0.7 | 0.7 | 0.3 |
| Cloisite ® 30B | 0.0 | 0.015 | 0.05 |
| Total | 1.0 | 1.015 | 1.05 |

*These constituents make up the SPF component of the material blend.

The nanocomposite used is Cloisite® 30B, which is a commercially available natural montmorillonite clay that had been modified with a ternary ammonium salt and is produced by Southern Clay Products.

Enpol® is a biodegradable aliphatic polyester film grade G4400 (formally known as G4600), produced by IRe Chemicals LTD. Enpol® has food contact approval and a slightly lower cost.

Film Blowing

The Axon BX-25 single screw extruder and film tower was used to produce blown film. The temperature profile and film blowing parameters used to manufacture the film are listed in the results section of this example.

Tensile Properties

The tensile properties of the film were measured with an Instron (model 5584) and using Merlin software (version 4.42). The tensile tests were performed with a strain rate of 5 mm/min in accordance to ASTM D882-97 and provide information on the yield stress, tensile strength, tensile strain and the ultimate tensile strength.

Thermal Analysis

The thermal transitions of the blends were examined using a Differential Scanning Calorimeter model DSC 2920 Modulated DSC made by TA Instruments, using the program Thermal Solutions (version 1.2J) and was analysised with Universal Analysis software (version 2.6D). The melting temperature ($T_m$), recrystallization temperature ($T_c$) and associated energies of each transition for the three blends were measured and recorded over the temperature range of −50 to 200° C.

Results

Film Blowing

Tables 9, 10 and 11 summarise the temperature and processing profiles used to manufacture the film.

TABLE 9

Temperature Profiles (° C., set point in brackets)

| Material | Film Die | Valve/Die | Zone 4 | Zone 3 | Zone 2 | Zone 1 |
|---|---|---|---|---|---|---|
| 30SPF/ 70Enpol ® | 133 (130) | 131 (130) | 126 (125) | 127 (120) | 109 (110) | 86 (0) |
| 30SPF/ 70Enpol ®/ 1.5Cl30B | 120 (120) | 120 (120) | 119 (120) | 118 (115) | 113 (115) | 93 (0) |
| 70SPF/ 30Enpol ®/ 5Cl30B | 134 (135) | 128 (135) | 128 (130) | 143 (135) | 119 (120) | 76 (0) |

TABLE 10

Processing Parameters

| Material | Extruder Speed | Torque (amps) | Haul Off (RPM) | Winder Speed | Layflat (mm) |
|---|---|---|---|---|---|
| 30SPF/70Enpol ® | 30 | 3.0 | 11 | 5 | 310 |
| 30SPF/70Enpol ®/ 1.5Cl30B | 30 | 3.0 | 11 | 3 | 280 |
| 70SPF/30Enpol ®/ 5Cl30B | 30 | 3.1 | 10 | 3 | 260 |

Tensile Properties

A summary of the results from tensile testing is displayed in the following table.

TABLE 11

Tensile Results (standard deviation in brackets)

| Material | Tensile Strength (MPa) | Elongation at Break (%) | Ultimate Tensile Strength (MPa) | Strain at Ultimate Tensile Strength (%) | Thickness (μm) |
|---|---|---|---|---|---|
| 30SPF/70Enpol ® MD | 15.3 (3.4) | 94.2 (23.2) | 21.0 (5.5) | 88.5 (20.3) | 13.4 (4.9) |
| 30SPF/70Enpol ® CD | 18.5 (3.4) | 67.8 (23.2) | 22.2 (2.8) | 65.1 (23.9) | 10.8 (1.3) |
| 30SPF/70Enpol ®/1.5Cl30BMD | 16.1 (7.6) | 250.9 (43.9) | 25.3 (3.8) | 239.5 (48.8) | 19.1 (1.6) |
| 30SPF/70Enpol ®/1.5Cl30BCD | 11.9 (2.32) | 278.6 (44.4) | 19.5 (3.7) | 268.1 (47.47) | 19.6 (2.0) |
| 70SPF/30Enpol ®/5Cl30BMD | 6.0 (1.0) | 28.7 (6.1) | 7.6 (0.8) | 27.8 (5.98) | 37.3 (4.4)# |
| 70SPF/30Enpol ®/5Cl30BCD | 5.3 (1.4) | 22.2 (3.0) | 7.0 (0.8) | 21.8 (3.0) | 39.5 (2.5)# |

These values are for a film that underwent blocking; therefore the thickness is incorporating two sheets and half this value is considered to be the true thickness of one sheet of film.

Thermal Analysis
The DSC results are summarised in table 12.

TABLE 12

DSC results

| Material | $T_m$ (° C.) | $T_m$ (onset) (° C.) | $\Delta H(T_m)$ (J/g) | $T_c$ (° C.) | $T_c$ (onset) (° C.) | $\Delta H(T_c)$ (J/g) |
|---|---|---|---|---|---|---|
| 30SPF/70Enpol ® | 98.42 | 86.89 | 40.01 | 47.89 | 54.22 | 32.15 |
| 30SPF/70Enpol ®/1.5Cl30B | 98.70 | 87.26 | 33.59 | 52.78 | 58.47 | 29.39 |
| 70SPF/30Enpol ®/5Cl30B | 99.08 | 89.36 | 19.56 | 46.51 | 56.43 | 15.49 |

The three materials that were melt compounded were film blown on the Axon BX-25 film blowing unit successfully, each material formulation was then examined using tensile tests, thermal analysis and dynamic mechanical thermal analysis.

The films blowing profiles and temperature profiles for each of the three materials are listed in the results section of this report. During the film blowing process the extruder speed was kept constant and only the haul off and the winder were altered to aid the stability of the bubble. The temperature profiles ranged from 110 to 135° C.

Blocking was experience by Blend 3; it was believed to be due to the high starch and water content. Blocking occurs when the two side of the film fuse together after passing through the haul-off. When the starch globules come into contact they are attracted to each other and bond thus fusing the sheets together [which is commonly known as blocking]. This can be corrected by adjusting the water content.

All film produced was transparent and have different textures (see attached film). The high starch content material produced a film that has a smooth waxy texture. The waxy texture was not evident for the low starch content films. The two low starch films had very different textures, 1.5 parts CI30B produced a very smooth film, however the absence of the nanocomposite produced a film with a slight decrease in the smoothness. However by testing the coefficient of friction (ASTM D1894-95) the texture of the films may be optimised.

The tensile properties of the three films were measured and reported, the maximum tensile strength values ranged from 25.4 MPa for blend 2 in the machine direction to 7.0 MPa for blend 3 in the cross direction. The elongation at break values ranging from 250% for blend 2 in the machine direction to 22% for blend 3 in the cross direction. In summary blend 2 performed the best of all three materials, evidence that the incorporation of the nanocomposite has increased the strain at break and the UTS.

The three blends showed little variation between each other with respect to their thermal properties. The temperature for which each transition occurred varied only slightly for each blend, however the enthalpy of each transition decreased for each blend. This decrease is contradicting thermal trends observed with Bionolle™. Varying the amount of nanocomposite used will enable the material's behaviour to be optimized.

CONCLUSIONS

The three blends examined in this report were film blown successfully and their mechanical properties were measured and recorded. Blend 2 was the best performer of the three materials, being the most stable during film blowing and having the highest ultimate tensile strength and elongation at break. For blend 3 the processability and mechanical properties were improved, when compared to the same material composition from earlier experiments. Other blends can be optimized by using sufficient clay to achieve exfoliation and modifying the water content to control processability.

Those skilled in the art will understand that using the understanding derived from the examples variations may be made to the formulations to suit the intended requirements of the film.

The invention claimed is:

1. A biodegradable film forming material which includes
   a) 20 to 60% of a blend of starch and an hydroxypropylated high amylose starch
   b) 8 to 22% of starch plasticizers and processing agents
   c) 30 to 70% of one or more biodegradable aliphatic polyesters
   d) 1 to 10% of a layered silicate clay mineral.
2. A biodegradable material as claimed in claim 1 in which the clay has been treated with a starch compatible intercalating chemical.

3. A biodegradable material as claimed in claim 1 in which the polyester includes a polyester modified by reaction with maleic anhydride.

4. A biodegradable material as claimed in claim 1 in which the component b) consists of:
   a) from 0 to 20% by weight of a polyol plasticizer
   b) from 0.1 to 1.5 % by weight of a $C_{12\text{-}22}$ fatty acid or salt or a destructuring agent
   c) from 0 to 12 % by weight of added water.

5. A biodegradable material as claimed in claim 4 in which the destructuring agent is urea.

6. A biodegradable film forming material which includes:
   a) 20 to 50% of a blend of a modified starch and starch
   b) 8 to 20% of a plasticizer consisting of a blend of water and a polyol
   c) 30 to 70% of a biodegradable aliphatic polyester
   d) 1 to 5% of an organoclay whereby the resulting material is amorphous and transparent.

* * * * *